United States Patent [19]

Drewe et al.

[11] 3,920,443

[45] Nov. 18, 1975

[54] HERBICIDAL COMPOSITIONS

[75] Inventors: Nigel Wyndham Drewe, Maidstone; Alan Cecil Waters, Tonbridge; Peter Ernest Giffard, Gillingham, all of England

[73] Assignee: Imperial Chemical Industries Limited, London, England

[22] Filed: Mar. 23, 1973

[21] Appl. No.: 344,086

[30] Foreign Application Priority Data

Apr. 13, 1972 United Kingdom............... 17066/72

[52] U.S. Cl................................. 71/94; 71/DIG. 1
[51] Int. Cl.².......................................... A01N 9/22
[58] Field of Search ......................................... 71/94

[56] References Cited
UNITED STATES PATENTS

| | | | |
|---|---|---|---|
| 2,972,528 | 2/1961 | Brian et al. | 71/94 |
| 3,484,229 | 12/1969 | Floyd et al. | 71/DIG. 1 |
| 3,527,593 | 9/1970 | Brian et al. | 71/113 X |
| 3,620,711 | 11/1971 | White | 71/94 |
| 3,714,174 | 1/1973 | Colchester et al. | 71/94 |
| 3,723,444 | 3/1973 | Colchester et al. | 71/94 |
| 3,803,147 | 4/1974 | Cairns | 71/94 |

FOREIGN PATENTS OR APPLICATIONS

| | | | |
|---|---|---|---|
| 1,009,422 | 5/1957 | Germany | 71/94 |

*Primary Examiner*—James O. Thomas, Jr.
*Attorney, Agent, or Firm*—Cushman, Darby & Cushman

[57] ABSTRACT

Herbicidal compositions containing a bipyridylium quaternary salt and an alkyl pyridine odourant.

7 Claims, No Drawings

HERBICIDAL COMPOSITIONS

This invention relates to concentrated herbicidal compositions containing a herbicidal bipyridylium quaternary salt as an active ingredient.

Following the discovery of the insecticidal properties of DDT and the synthesis of the hormone type weed-killers exemplified by 2,4-dichlorophenoxyacetic acid, a large range of pesticides has been developed for agricultural use in the control of fungal and insect pests and weeds. While these substances are necessarily toxic to certain forms of life, when used with due care and in accordance with governmentally approved codes of practice, they present no hazard to human life. However, in spite of efforts to encourage those concerned with pesticides to adopt safe handling practices, instances of misuse of pesticides do occur. One particular unsafe practice in the case of liquid pesticides is for an operator to transfer a small amount of the concentrated pesticide to a domestic container such as a beverage bottle for subsequent use at home. The risk attached to this practice is of course that a child or incautious adult coming upon the bottle may swallow the contents with possibly serious consequences.

A method of formulating concentrated aqueous solutions of herbicidal bipyridylium quaternary salts has now been devised which reduces the likelihood of accidental swallowing of these herbicides in the circumstances described above.

According to the present invention, there is provided a concentrated herbicidal composition comprising an aqueous solution of a salt of a herbicidal bipyridylium quaternary cation, which contains an odourant comprising an alkyl pyridine. The unpleasant smell of the odourant acts as a warning that the composition is not a beverage.

Preferably the composition also comprises a surface-active agent. Preferred salts of herbicidal bipyridylium quaternary cations for use in the compositions of the invention are those of the following formulae:

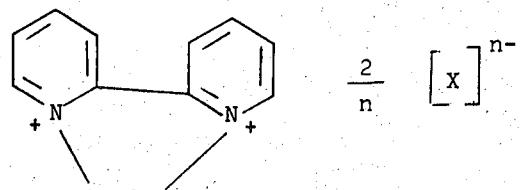

or

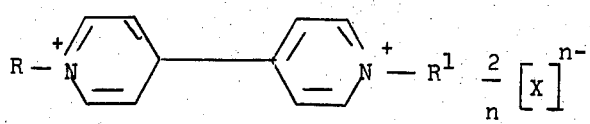

wherein R and R¹, which may be the same or different, stand for alkyl radicals of from 1 to 4 carbon atoms which may be substituted by hydroxy, halogen, carboxyl, lower alkoxy, lower alkylcarbonyl, lower alkoxycarbonyl, carbamoyl or N-lower alkyl substituted carbamoyl; $[X]^{n-}$ represents an anion and $n$ is an integer from 1 to 4 inclusive. By lower alkoxy, alkoxycarbamoyl, alkylcarbonyl or alkyl, we mean radicals containing an alkyl group of 1 to 4 carbon atoms.

Particularly preferred salts of herbicidal bipyridylium quaternary cations are those listed below:

1,1'-ethylene-2,2'-bipyridylium dibromide (diquat dibromide)
1,1'-dimethyl-4,4'-bipyridylium dichloride (paraquat dichloride)
1,1'-di-2-hydroxyethyl-4,4'-dipyridylium dichloride
1-(2-hydroxyethyl)-1'-methyl-4,4'-bipyridylium dichloride.
1,1'-di-carbamoylmethyl-4,4'-bipyridylium dichloride
1,1'-bis-N,N-dimethylcarbamoylmethyl-4,4'-bipyridylium dichloride
1,1'-bis-N,N-diethylcarbamoylmethyl-4,4'-bipyridylium dichloride
1,1'-diacetonyl-4,4'-bipyridylium dichloride.
1,1'-diethoxycarbonylmethyl-4,4'-bipyridylium dibromide
1,1'-diallyl-4,4'-bipyridylium dibromide The names in brackets alongside some of the compounds in the above list are the accepted common names for the cationic portion of these compounds. Thus "paraquat" is the common name for the 1,1'-dimethyl-4,4'-bipyridylium cation. Paraquat is a particularly preferred bipyridylium cation for use in the compositions of the invention.

Since the herbicidal effect of a bipyridylium quaternary cation is independent of the nature of the associated anion, the choice of the anion is a matter of convenience, depending, for example, on cost. Preferably the anion is one which gives rise to a salt of convenient water solubility. Examples of anions, which may be mono- or poly- valent, include acetate, benzenesulphonate, benzoate, bromate, bromide, butyrate, chlorate, chloride, citrate, formate, fluorosilicate, fumarate, fluoroborate, iodide, lactate, malate, maleate, methylsulphate, nitrate, propionate, phosphate, salicylate, sulphamate, succinate, sulphate, thiocyanate, tartrate, and p-toluenesulphonate. The salt of the herbicidal bipyridylium cation may be formed from a number of similar anions or mixtures of different ones. A salt having any particular desired anion may be prepared either by direct synthesis from reactants which include the desired anion, or by exchanging the anion of a previously prepared salt for the preferred anion by methods well known in the art, for example by passage of a solution of the previously prepared salt through an ion-exchange resin. For reasons of convenience and economy, the chloride anion is a particularly preferred anion.

Since the characteristic herbicidal activity of a salt of a herbicidal bipyridylium quaternary cation resides in the cation only, it is customary to quote concentrations of active ingredient and rates of application in terms of the amount of bipyridylium quaternary cation used, thus avoiding the inconvenience of having to quote different application rates for different salts of the same bipyridylium quaternary cation. Application rates and concentrations quoted in this specification therefore relate to the amount of herbicidal bipyridylium quaternary cation unless otherwise stated.

The amount of herbicidal bipyridylium quaternary cation present in the compositions of the invention is preferably from 0.5 to 3.0 pounds per Imperial gallon (50 grams to 300 grams per liter) and more preferably from 1.0 to 2.5 pounds per Imperial gallon (100 to 250 grams per liter).

Surface active agents may be cationic, non-ionic or anionic. Generally speaking cationic and non-ionic surface-active agents are preferred to anionic surface active agents for use in the compositions of the invention, since the latter may interact undesirably with the bipyridylium quaternary salt in the composition. Examples of non-ionic surface agents for use in the compositions of the invention include the condensation products of ethylene oxide with alkyl phenols such as octylphenol, nonylphenol and octylcresol. Other non-ionic agents are the partial esters derived from long chain fatty acids and hexitol anhydrides, for example sorbitan monolaurate; the condensation products of the said partial esters with ethylene oxide; and the lecithins.

The amount of surface-active agent present in the composition is preferably from 20 to 100 grams per liter of the composition.

Examples of cationic surface agents include quaternary salts, for example the substances sold under the Trade Mark "Arquad" and "Duoquad". The alkyl pyridine used in the compositions of the invention may be for example a pyridine substituted by one, two or three alkyl radicals. The alkyl radical is preferably a lower alkyl radical, containing from one to four carbon atoms. Preferred alkyl pyridines for use in the compositions of the invention are methyl substituted pyridines, for example 2-, 3- and 4-picoline, the dimethyl pyridines (lutidines) and the trimethyl pyridines (collidines). Conveniently a mixture of alkyl pyridines may be used in the compositions of the invention, for example the commercially available mixture of pyridine derivatives obtained as a by product of the purification of pyridine derived from coal tar. This mixture is referred to as 'pyridine base. A preferred pyridine base is that denoted by the code number 95/180, and conforming to the specification laid down in British Standard No. 3099 of 1969, published in 1970 by the British Standards Institute. This mixture has a boiling point range substantially from 140° to 180°C.

The compositions of the invention are concentrates which may be conveniently transported and stored, and which may be diluted with water as required to form a solution of suitable strength for application when required for use. As noted above, the concentrates may contain for example from 50 grams to 300 grams per liter of herbicidal bipyridylium quaternary cation. The choice of an odourant for a composition of this kind is by no means a simple matter. Many substances are not miscible with or soluble in solutions of bipyridylium salts of this concentration with the result that the excess of odourant floats on the surface of the concentrate. This results in uneven distribution of the odourant when the concentrate is re-packed into small containers from bulk. Insoluble substances are therefore unsuitable as odourants. Furthermore, the odourant must not react chemically with the active ingredient, or otherwise impair the herbicidal properties of the latter. Since many months may elapse between the formulation of herbicidal concentrate and its use, it is essential for the odourant not to deteriorate on storage.

Examples of substances considered to product too weak an odour to be satisfactory deterrents when mixed with solutions of herbicidal bipyridylium salts include glacial acetic acid, formic acid chloronaphthalene, 2,4-dichlorophenol, Jeye's Fluid, methyl nonyl ketone, valeric acid, "Renardine", ("Renardine" is a Trade Mark for a fox repellent), "Pine" disinfectant ("Pine" is a Trade Mark), crude fuel oil, diesel oil, crude fish oil, and creosote. Some of these (e.g. crude fish oil, diesel oil, creosote) were in any case unsuitable because they were immiscible with the herbicidal concentrate.

Compositions according to the invention preferably contain from 5 grams to 20 grams of the alkyl pyridine or mixture of alkyl pyridines as the odourant per liter of the composition. Preferably the amount of alkyl pyridine or pyridines used is from 10 grams to 20 grams per liter of composition.

The invention also provides compositions which, in addition to an odourant, further comprise a gel-forming amount of a gelling agent, which is included in the composition in order to render it thixotropic. Thixotropic compositions are less likely to be swallowed by accident, since on standing they form a gel and will not pour unless vigorously shaken to break down the gel. Thus, if a thixotropic herbicidal composition comprising an aqueous solution of a salt of a herbicidal bipyridylium salt containing a gel-forming amount of a gelling agent, together with an odourant comprising an alkyl pyridine, is placed in a narrow necked beverage bottle, for example a beer bottle, a person finding the bottle will be warned by the smell of the odourant that the contents are not a beverage. A second warning will be given by the failure of the contents to pour out until the bottle has been vigorously shaken. The risk of accidental swallowing of the composition of the invention is therefore very much reduced as compared with the risk when a concentrated aqueous solution of a herbicidal bipyridylium cation, which is odourless and highly fluid, is negligently placed in an unlabelled bottle.

Examples of gelling agents include gel forming water-soluble polymers, finely divided silica and finely divided alumina. The compositions may also comprise a surface-active agent in addition to the gelling agent and odourant.

A preferred gelling agent is a combination of borate salt with xanthan gum. Xanthan gum is a watersoluble polysaccharide which, then dissolved in water containing a borate salt (e.g. sodium metaborate) forms a gel. Xanthan gum is obtained by bacterial fermentation as described for example in column 2, lines 13 to 65 of U.S. Pat. No. 3,326,733, which description is herein incorporated by reference. A preferred form of xanthan gum is that sold under the Trade Mark "Kelzan". The strength of the gel can be varied by varying the amount of xanthan gum and borate salt used in the solution.

The amount of gelling agent used in the compositions according to the invention is preferably from 3 to 350 grams per liter. Generally speaking, the amount of gelling agent is from 3 to 5 grams per liter when a water-soluble polymer is used, while greater amounts, for example from 150 grams to 300 grams, are used when the gelling agent is a finely divided solid. When xanthan gum is used, the preferred amount is from 3 grams to 15 grams per liter, in combination with from 50 to 1000 parts per million by weight of the composition of sodium metaborate or an equivalent amount of another borate salt.

When xanthan gum and a borate salt are used in combination as the gelling agent, the strength of the gel varies somewhat with the pH of the solution, the gel being less rigid at low values of pH. In general, it is preferred that the pH of the solution should not be less than 6. High values of pH are preferably also avoided since these have an adverse effect upon the storage stability of bipyridylium salts. A preferred range of pH values for compositions containing xantham gum and borate as a gelling agent is from 6 to 9. A particularly preferred range is from 6.5 to 7.5 inclusive.

The inclusion of the odourant in compositions according to the invention has no adverse effect upon the herbicidal activity of the compositions. The invention is illustrated by the following Examples.

EXAMPLE 1

This Example illustrates a composition according to the invention which comprises a gelling agent in addition to the pyridine base added as odourant. The composition comprises the following ingredients.

| Ingredients | Amount in Grams |
| --- | --- |
| Paraquat concentrate | x |
| "Kelzan" | 0.4 (added as 1% solution in water) |
| Sodium metaborate | 0.014 |
| Lissapol NX | 1.1 |
| DS 4392 | 4.1 |
| Pyridine base 95/180 | 1.0 |
| Silcolapse 5000 | 0.01 |
| Water | to 100 ml. |

In the above table, $x$ represents the amount of paraquat concentrate necessary to give 2 pounds of paraquat ion per Imperial gallon (200 grams of paraquat ion per liter). Paraquat concentrate is an aqueous solution of paraquat dichloride containing 25% to 30% by weight of 1,1'-dimethyl-4,4'-bipyridylium cation.

"Kelzan" is a Trade Mark for xanthan gum, which is a complex polysaccharide gum.

"Silcolapse" is a Trade Mark for an antifoaming agent comprising a silicone derivative.

"Lissapol" NX is a Trade Mark for a surface active agent comprising a condensate of from 7 to 8 molar proportions of ethylene oxide with 1 molar proportion of p-nonylphenol.

DS 4392. This is a code number of a surface-active agent comprising a mixture of amines derived from soya bean fatty acids and commercially available under the name of "soya amine", condensed with approximately 15 molar proportions of ethylene oxide.

The composition described above was prepared by simple agitation of the ingredients together and was sufficiently fluid when prepared to be poured into containers. On standing for 15 to 20 minutes the composition formed a gel and was not pourable unless vigorously shaken.

EXAMPLE 2

This Example illustrates a composition according to the invention which comprises a concentrated aqueous solution. The composition comprises the following ingredients.

| Ingredient | Amount in grams |
| --- | --- |
| Paraquat dichloride solution containing 25–30% paraquat cation | x |
| Sodium benzoate | 2.0 |
| Sodium metaborate | 1.3 |
| DS 4392 | 4.1 |
| Lissapol NX | 1.1 |
| Pyridine base 95/180 | 1.0 |
| Silcolapse 5000 | 0.01 |
| Water | to 100 ml. |

Where $x$ gives 200 grams of paraquat ion per liter.

We claim:

1. A concentrated herbicidal composition, comprising an aqueous solution of a herbicidally effective amount of a salt of a herbicidal bipyridylium quaternary cation selected from the group consisting of compounds of the formula:

$$\text{(bipyridylium-ethylene bridged structure)} \quad \frac{2}{n}[X]^{n-}$$

and $$R-\overset{+}{N}\underset{\phantom{x}}{\bigcirc}-\underset{\phantom{x}}{\bigcirc}\overset{+}{N}-R^1 \quad \frac{2}{n}[X]^{n-}$$

wherein R and $R^1$ are selected independently from the group consisting of alkyl radicals of from 1 to 4 carbon atoms and alkyl radicals of from 1 to 4 carbon atoms substituted by a radical selected from the group consisting of hydroxy, halogen, carboxyl, lower alkoxy, lower alkylcarbonyl, lower alkoxycarbonyl, carbamoyl and N-lower alkyl substituted carbamoyl; $[X]^{n-}$ represents an anion and $n$ is an integer of from 1 to 4 inclusive; together with an effectively warning amount of an odourant comprising an alkyl pyridine, said composition reducing the likelihood of accidental swallowing of said herbicidal salt by virtue of the unpleasant smell of the odourant.

2. A composition according to claim 1 which further comprises a surface-active agent.

3. A composition according to claim 1 wherein the alkyl pyridine comprises a methylpyridine.

4. A composition according to claim 1 wherein the odourant comprises a mixture of alkyl pyridines having a boiling point range of from 140° to 180°C.

5. A composition according to claim 1 wherein the odourant is present in the proportion of from 5 to 20 grams per liter of the composition.

6. A composition as claimed in claim 1 which further comprises a gel forming amount of a gelling agent.

7. A composition according to claim 6 wherein the gelling agent comprises a combination of xanthan gum with a borate salt.

* * * * *